(No Model.)
P. W. GROOM.
SHOVEL.
No. 359,967. Patented Mar. 22, 1887.
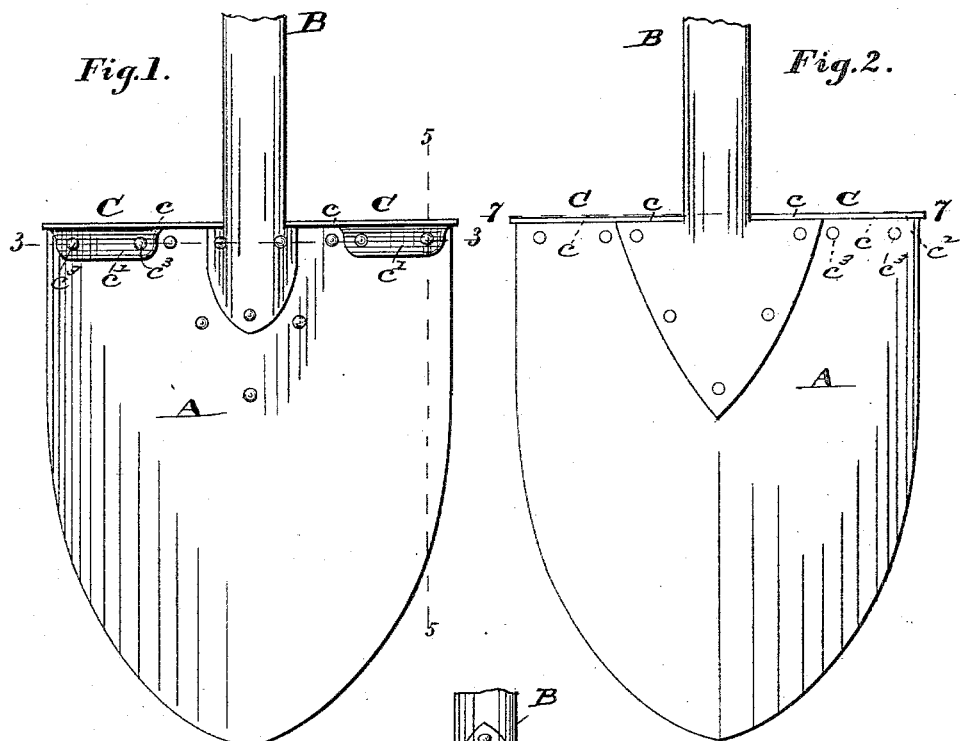
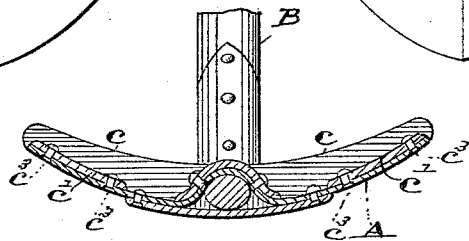
Fig. 3.
Fig. 4. Fig. 5. Fig. 6.
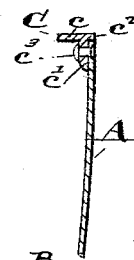
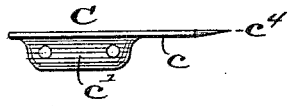
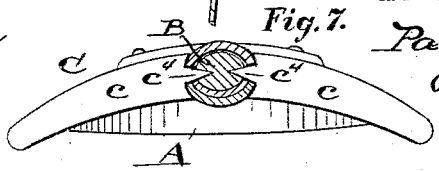
Fig. 7.
Witnesses:
W. B. Anderson.
J. W. Hoke.
Inventor:
Patrick W. Groom
by C. Dunwoody
atty

United States Patent Office.

PATRICK W. GROOM, OF ST. LOUIS, MISSOURI, ASSIGNOR TO THE ST. LOUIS SHOVEL COMPANY, OF SAME PLACE.

SHOVEL.

SPECIFICATION forming part of Letters Patent No. 359,967, dated March 22, 1887.

Application filed June 14, 1886. Serial No. 205,159. (No model.)

*To all whom it may concern:*

Be it known that I, PATRICK W. GROOM, of St. Louis, Missouri, have made a new and useful Improvement in Shovels, of which the following is a full, clear, and exact description.

The improvement consists in a peculiarly-constructed step attached to the shovel, substantially in the manner hereinafter described, and designated in the claim.

In the annexed drawings, making part of this specification, Figure 1 is a front elevation of that part of the shovel with which the improvement in question is immediately associated. Fig. 2 is a rear elevation of the same. Fig. 3 is a horizontal section, looking upward on the line 3 3 of Fig. 1. Fig. 4 is a bottom view of the part that forms the step. Fig. 5 is a vertical section on the line 5 5, Fig. 1. Fig. 6 is a side elevation of the part shown in Fig. 4, and Fig. 7 is a horizontal section on the line 7 7 of Fig. 2.

The same letters of reference denote the same parts.

A represents the shovel-blade, and B represents the shovel-handle, which parts are constructed in the ordinary manner.

I desire not to be confined to the particular type of shovel exhibited in applying the improvement; but the type of shovel shown is one to which the improvement is specially adapted.

C represents the improved step. The shovel is preferably provided with two of them, arranged, respectively, at each side of the shovel-handle.

The step consists, substantially, of a horizontal portion, $c$, and a vertically-extended lug, $c'$. The horizontal portion in length extends from the shovel-handle well toward and generally quite to the side edge of the shovel-blade, and in width it is extended sufficiently to form a broad bearing or step for the operator's foot, substantially as shown more distinctly in Fig. 7. The portion $c$, at its back, conforms in outline to that of the shovel-blade, and when the step is in position the rear edge, $c^2$, of the portion $c$ comes, as shown in Fig. 5, flush with the back of the shovel-blade. The lug $c'$ is set in from the rear edge, $c^2$, a distance equal to the thickness of the shovel-blade. The step is fastened to the shovel-blade by means of the rivets $c^3$, Figs. 1, 2, 3, 5. The fastening is made more complete by providing the portion $c$ with or extending it to form a point, $c^4$, Figs. 4, 6, 7, which point, when the step is attached, is, as shown in Fig. 7, made to penetrate the shovel-handle. In this manner a step is provided for the shovel which does not in the least project rearwardly beyond the back of the shovel-blade. There is therefore no projection upon the back of the shovel-blade to form an obstacle to its use, or against which dirt is liable to collect.

I am aware that shovels have been provided with a rest for the foot, and hence I do not broadly lay claim thereto, my present object being to contrive a support for the foot that when attached to the shovel-blade shall leave the blade at the back wholly free of any projection, such as shown in the constructions referred to, and

What I claim is—

A shovel-blade step consisting of a horizontal portion, $c$, adapted to come flush with the back of the shovel-blade, and provided with the lug $c'$, as and for the purpose described.

PATRICK W. GROOM.

Witnesses:
C. D. MOODY,
B. F. REX.